US005329415A

United States Patent [19]

Oyamada

[11] Patent Number: 5,329,415

[45] Date of Patent: Jul. 12, 1994

[54] CLUTCH-BRAKE DRIVE CONTROL FOR PRESS MACHINE

[75] Inventor: Yasuhiko Oyamada, Sagamihara, Japan

[73] Assignee: Aida Engineering Ltd., Japan

[21] Appl. No.: 871,080

[22] Filed: Apr. 20, 1992

[30] Foreign Application Priority Data

| | | | |
|---|---|---|---|
| Apr. 26, 1991 | [JP] | Japan | 3-96827 |
| May 9, 1991 | [JP] | Japan | 3-103049 |
| May 10, 1991 | [JP] | Japan | 3-105682 |

[51] Int. Cl.⁵ .... H02H 3/28

[52] U.S. Cl. .... 361/86; 361/100; 361/170

[58] Field of Search .... 361/5-8, 361/13, 85, 86, 100, 170, 187, 181; 318/327, 560, 563; 307/116, 125, 127, 130

[56] References Cited

U.S. PATENT DOCUMENTS

| | | | |
|---|---|---|---|
| 3,686,554 | 8/1972 | Getz | 318/327 |
| 3,882,361 | 5/1975 | Hinman | 361/85 |
| 4,199,727 | 4/1980 | Barnes | 328/71 |
| 4,574,343 | 3/1986 | Inatomi | 364/184 |
| 4,670,810 | 6/1987 | Valeur | 361/5 |
| 4,757,417 | 7/1988 | Futsuhara | 361/86 |
| 4,823,350 | 4/1989 | Yamazaki | 372/38 |

FOREIGN PATENT DOCUMENTS

| | | | |
|---|---|---|---|
| 63-257452 | 10/1988 | Japan | H03K 17/73 |
| 1-125019 | 5/1989 | Japan | H03K 17/725 |
| 1604692 | 12/1981 | United Kingdom | H02H 3/16 |
| 2206754 | 1/1989 | United Kingdom | H02H 7/00 |

OTHER PUBLICATIONS

Patent Abstracts of Japan, vol. 13, No. 421 (E-822) [3769], Sep. 19, 1989, p. 97 E 822, No. 1-157 223.

*Primary Examiner*—A. D. Pellinen
*Assistant Examiner*—S. Jackson
*Attorney, Agent, or Firm*—Steven M. Rabin

[57] ABSTRACT

An ON-OFF control of a clutch-brake for a press machine, having fail-safe operation. The clutch-brake drive control is provided by turning double solenoid valves on and off. Two lines of drive control signal generators output drive control signals to semiconductor elements when a running command pulse signal is recognized as valid. A bus collating circuit forcibly cuts off AC power supplies of solenoid driving circuits when synchronization and coordination of the operation of each of the lines are checked and found not in coordination. Two lines of fault detecting circuitry forcibly cuts off the AC power supplies of the solenoid driving circuits by automatically detecting a fault of the semiconductor elements.

10 Claims, 6 Drawing Sheets

CLUTCH-BRAKE DRIVE CONTROL FOR PRESS MACHINE

BACKGROUND OF THE INVENTION

Description of the Prior Art

FIG. 9 shows general arrangement of a press machine.

In this figure, the reference numeral 72 represents a crankshaft. On an eccentric portion 72e, a slide 74 is connected via a connecting rod 73. On the crankshaft 72, rotary motive power is applied from a driving shaft 71 via a gear train 75. A flywheel 76 rotated and driven by a motor 77 via a belt 78 is connected to or separated from the driving shaft 71 by a clutch device 80. On the other hand, the driving shaft 71 is braked by a brake device 90.

Therefore, when the brake device 90 is released (turned OFF) and the clutch device 80 is connected (turned ON), rotating energy accumulated on the flywheel 76 is transmitted to the driving shaft 71, and this makes it possible to move a slide 74 up or down via the gear train 75, the crankshaft 72, and the connecting rod 73. To stop the slide 74 at a desired stop position such as top dead center, it is widely known that the clutch device 80 should be separated (OFF) and the brake device 90 should be operated (ON).

The clutch device 80 is turned on when a solenoid 15 is energized (turned ON) to open a solenoid valve 15V and air under a predetermined pressure P is supplied to a supply inlet through an air feed piping 81. The clutch device is turned off when the solenoid 15 is de-energized (turned off) by resilient force of a spring when air pressure is released. On the other hand, the brake device 90 is turned on by resilient force of a spring in normal condition, and it is turned off when the solenoid 15 is energized (turned on) to open the solenoid valve 15 and the air under a predetermined pressure P is supplied through an air feed pipe 91. Accordingly, it is generally arranged that the two solenoids 15 and 15 are energized (turned ON) at the same time.

Description will be given later on 1P, 30P and 10P, which constitute a drive control in FIG. 9. In FIG. 9, a separate type arrangement is shown, while it is essentially the same as a combination type clutch-brake (80, 90), in which the clutch device 80 and the brake device 90 are integrated together.

Meanwhile, the driving control of the solenoid 15 for solenoid valve, which supplies and discharges the air for the clutch-brake (80, 90) of a press machine, must be performed timely, quickly and accurately.

In a press machine, which is operated at more than 400 SPM, the follow-up speed cannot catch up if it is controlled by a drive control comprising a mechanical switch, an auxiliary relay, etc., and a semiconductor device must be adopted as a power switch.

For this reason, the following arrangement has been used in the past: As shown in FIG. 10, a drive control signal CNT is generated according to an ON-OFF command signal (running signal) of the solenoid 15, and either one of solenoid driving circuits (10P, 110P) is selectively adopted. That is, either an AC power system (10P), in which an AC switching semiconductor element (such as TRIAC) under ON-OFF control by the above drive control signal CNT (trigger pulse TP) and a solenoid 15 are connected in series with an AC power supply (AC), or a DC power system (110P), which comprises a rectifier (Ref) with its primary side connected in series with an AC power supply (AC) as shown in FIG. 11 and a DC switching semiconductor element 111 (such as transistor) connected in series with a solenoid 115 on a secondary (DC) side of the rectifier (Ref) has been selectively adopted.

Generally, the DC power system (110P) of FIG. 11 can turn on and off the solenoid 115 with no variation in time to ON-OFF of the driving signal DRV, but it is disadvantageous in that the OFF time may be extended depending upon constant of electric circuit such as a diode for surge absorption. On the other hand, it is possible in the AC power system (10P) of FIG. 10 to drive at high speed and at low cost because of power facility. Thus, the AC power system is adopted in most cases.

To ensure higher safety, it is attempted to constitute the solenoid valve by a double solenoid valve comprising two solenoids 15 and 15 and to connect the two solenoids 15 and 15 in parallel to a semiconductor element 11 shown in FIG. 10, or to provide a respective solenoid driving circuit (10P, 10P) for each solenoid 15.

A conventional type drive control of an AC power system comprises, as shown in FIG. 10, a running operation panel (1P) having a manual running button 2 generally connected to a DC power supply (DC), a control panel 30P including drive control signal generating means for outputting the drive control signal CNT according to an ON-OFF command signal (running signal) issued from the running operation panel (1P) when the manual running button 2 (auxiliary relay contact if such is used) is turned on, and said solenoid driving circuit 10P.

In case a drive control of an AC power system is adopted for a clutch-brake of a press machine, special care is taken on components to ensure more safety. In particular, in the semiconductor element 11 of FIG. 10, which forms an essential part, a fault is likely to occur symmetrically, i.e. a fault is likely to occur on continuity side or on cut-off side. Even when the drive control signal CNT (TP) is turned on, the solenoid 15 is not driven if a fault occurs on the cut-off side of the semiconductor element 11. However, such a condition is on the so-called safety side, and this does not become an issue very often.

In contrast, even when the drive control signal CNT is turned off, it is very dangerous, if the semiconductor element 11 is in trouble on the continuity side. Because the press is not stopped even when a press command signal is issued (running signal S and drive control signal CNT are turned off), there may occur problems such as damage of equipment including dies or a serious human accident.

That is, even when a stop command has been given, it is absolutely not allowed that the press machine of FIG. 9 (slide 74) is continuously operated (upward and downward reciprocal movement), because this will impair safety and reliability of the system.

Further, even when the solenoid driving circuit 10P including the semiconductor element 11 is normal, the safety and the reliability of the entire system are impaired if the drive control signal generating means (30P) and the running operation panel 1P are in trouble. That is, the running signal S and the drive control signal CNT must be truly effective because, even when these two signals S and CNT are abnormal signals, the solenoid driving circuit 10P turns the solenoid (clutch-brake) on. Particularly, it causes a serious problem if the AC power system (AC) is adopted for the running operation panel 1P for the same reason in the case of the solenoid driving circuit 10P.

Thus, in case a drive control of the AC power system using the semiconductor element 11 is adopted in a clutch-brake of a press machine, it is important not only to increase the reliability of the semiconductor element and circuit system, but also to provide reliable and fail-safe operations to ensure safe and smooth operation of the system.

SUMMARY OF THE INVENTION

It is an object of the present invention to provide a clutch-brake drive control for a press machine, by which it is possible to detect a fault in circuit components, including a semiconductor element, quickly and accurately while automatically judging the validity of a running command pulse signal, and a drive control signal and to provide a perfect fail-safe operation for an emergency stop page of the press in case of abnormal operation.

A clutch-brake drive control for a press machine according to a first aspect of the present invention performs drive control of the clutch-brake by turning on and off a solenoid valve, and it is characterized in that there are provided a solenoid driving circuit (10), in which a solenoid (15) of said solenoid valve, an AC power supply (AC) and a semiconductor element (11) for opening and closing said AC power supply (AC) are connected in series, running command pulse signal generating means (1) for generating a running command pulse signal (SS) for synchronizing ON-OFF condition of a running button (2) with the AC power supply, zero-cross synchronized pulse signal generating means (2) for generating a zero-cross synchronized pulse signal (ZCRS) synchronized with zero-cross point of the AC power supply (AC), drive control signal generating means (30) for generating and outputting a drive control signal (CNT) to said semiconductor element (11) under the condition that said running command pulse signal (SS) has been identified as valid by comparing synchronization of said inputted running command pulse signal (SS) and said zero-cross synchronized pulse signal (ACRS), synchronized signal generating means (51A, 52A) for generating synchronized signals (FB1, FB2) synchronized with the AC power supply (AC) in case said semiconductor element (11) is turned off, and fault detecting means (31A, 32A, etc.) for detecting a fault of said semiconductor element (11) from a combination of said synchronized signals (FMB1, FGB2) and said drive control signal (CNT) and also for forcibly cutting off said AC power supply (AC) of said solenoid driving circuit (10) when a fault has been detected.

A clutch-brake drive control for a press machine according to a second aspect of the present invention comprises a pair of solenoid driving circuits (10A, 10B), running command pulse signal generating means (1), zero-cross synchronizing pulse signal generating means (20), two lines of drive control signal generating means (31A, 32A, etc.; 31B, 32B, etc.), collating means (40), and two lines of fault detecting means (31A, 32A, 31B, 32B, etc.), and it is characterized in that drive control is performed for each of the solenoids (15A, 15B) of a double solenoid valve.

According to the above arrangement described in reaction to the first aspect of the present invention, when the running button (2) is turned on, a running command pulse signal (SS) synchronized with the AC power supply (AC) is outputted from the running command pulse signal generating means (1). Also, a zero-cross synchronized pulse signal (ZCRS) synchronized with zero-cross point of the AC power supply (AC) is outputted from the zero-cross synchronized pulse signal generating means (20).

The drive control signal generating means (30) compares the running command pulse signal (SS) with the zero-cross synchronized pulse signal (ZCRS) and automatically judges the validity of the running command pulse signal (SS) by checking synchronization of both signals (SS and ZCRS). If it is found valid, a drive control signal (CNT) for on-off control of semiconductor element (11) is outputted to the solenoid driving circuit (10). Because both the running command pulse signal (SS) and the zero-cross synchronized pulse signal (ZCRS) are generated by synchronizing with the AC power supply (AC), the two pulse signals (SS and ACRS) are synchronized with each other in a normal case.

On the other hand, fault detecting means (31A, 32A, etc.) detects fault of the semiconductor element (11) through combination of output conditions of the drive control signal (CNT) thus confirmed and synchronized signals (FB1 and FB2) from synchronized signal generating means connected in parallel with semiconductor element (11). When the fault is detected, the AC power supply (AC) of the solenoid driving circuit (10) is forcibly cut off.

Therefore, on-off drive of the clutch-brake can be safely and reliably controlled. In case the validity of the running command pulse signal (SS) and the drive control signal (CNT) is doubtful, or in case fault occurs in the semiconductor element (11) on the continuity side, AC power supply (AC) of the solenoid driving circuit (10) can be forcibly cut off and the clutch-brake can be turned off (press machine is stopped). This provides perfect fail-safe function.

According to the above arrangement described with respect to the second aspect of the present invention, operation in each system is essentially the same as in the arrangement of according to the first aspect, except that the collating means (4) automatically checks coordination of generation of each of the drive control signals (CNT, CNT) in each of the drive control signal generating means (31A, 32A, etc.; 31B, 32B, etc.). Because each of the drive control signals (CNT, CNT) is generated by inputting the same running command pulse signal (SS), it is automatically checked that the output timing of the two signals (CNT, CNT) are the same in normal operation.

Thus, if the two drive control signals (CNT, CNT) are synchronized and valid, these are outputted to the solenoid driving circuits (10A, 10B). On the other hand, if it is judged as abnormal, the fault detecting means (31A, 32A, 31B, 32B) forcibly cuts off the AC power supply (AC, AC) of the solenoid driving circuits (10A, 10B).

Because this is a double checking system, perfect fail-safe operation is furnished.

According to the first aspect of the present invention, there are provided a solenoid driving circuit (10), running command pulse signal generating means (1), zero-cross synchronized signal generating means (20), drive control signal generating means (30), synchronized signal generating means (51A, 52A), and fault detecting means (31A, 32A, etc.), and synchronization validity of the running command pulse signal (SS) and the zero-cross synchronized pulse signal (ZCRS) are automatically identified, and the fault of the semiconductor element (11) is also automatically detected from the combination of the output conditions of the drive control signal (CNT) and the synchronized signals (FB1, FB2). Accordingly, it is possible to provide a clutch-brake drive control for a press machine with fail-safe operation, i.e. the function to immediately stop the press machine for safety in case a fault is detected.

Accordingly to the second aspect of the present invention, there are provided a pair of solenoid driving circuits (10A, 10B), running command pulse signal generating means (1), zero-cross synchronized pulse signal generating means (20), two lines of drive control signal generating means (31A, 32A, etc.; 31B, 32B, etc.), collating means (40), two lines of fault detecting means (31A, 32A, etc.; 31B, 32B, etc.), and, in addition to the invention of the first aspect, the coordination of generation of two drive control signals (CNT, CNT) by the two drive control signal generating means is automatically identified. Thus, more perfect fail-safe function can be furnished by the adoption of the double solenoid valve.

This ensures high speed operation and safety of press fabrication and contributes to the protection of equipment and personnel as well as to the improvement of production efficiency.

Figure 1:
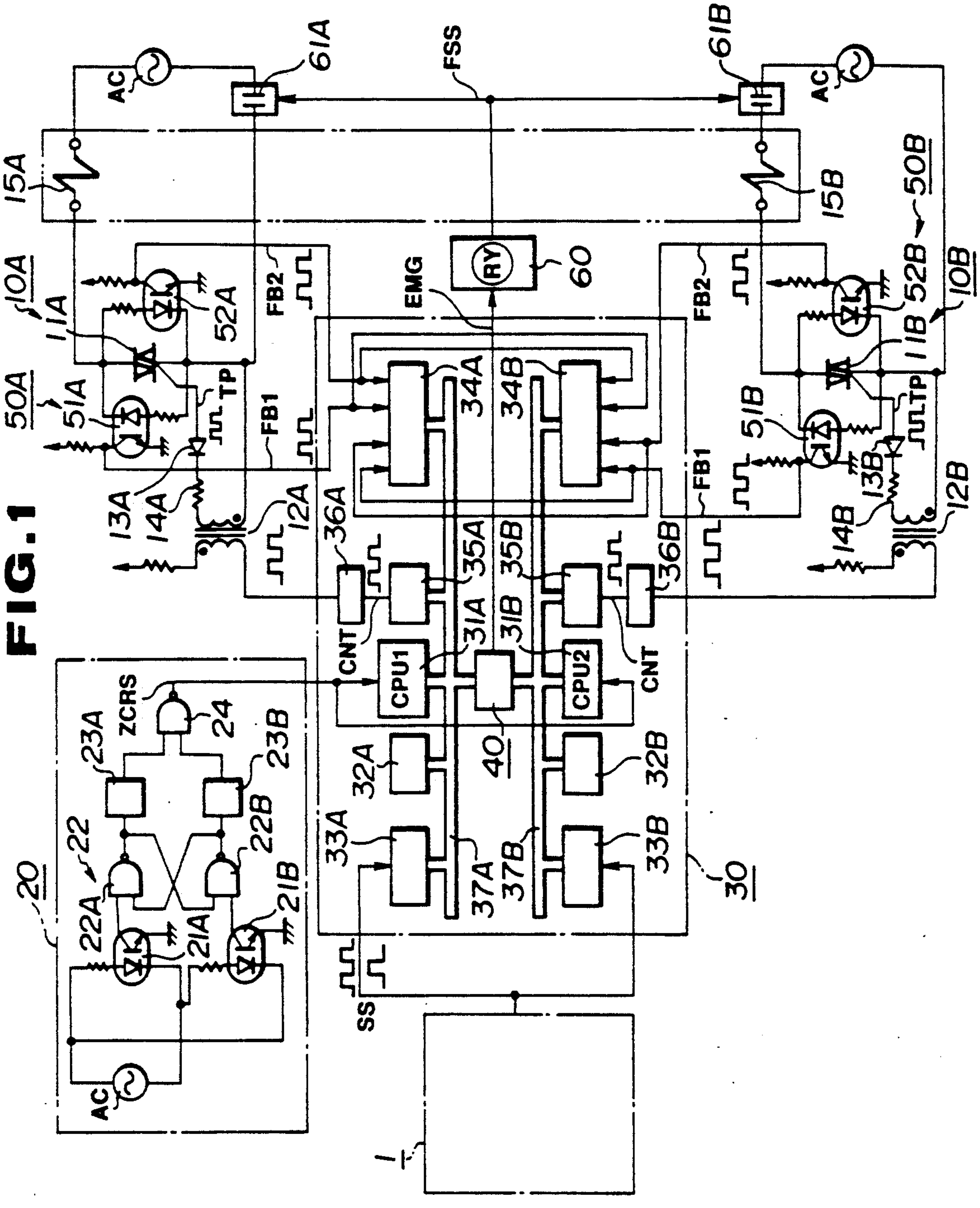
FIG. 1 is a general block diagram of an embodiment of the present invention.

In the figures, the reference numeral 1 designates a running operation panel for providing running command pulse signal generating means. The numeral 2 designates a manual running botton, 10A and 10B each designates a solenoid driving circuit, 11A and 11B each designates a TRIAC (semiconductor element), 12A and 12B pulse transformers, 15A and 15B solenoids (double solenoid valve), 20 a power supply zero-cross synchronizing circuit (zero-cross synchronized pulse signal generating means), 22 (22A and 22B) flip-flop circuits, 23A and 23B one-shot circuits, 30 a control panel (drive control signal generating means and fault detecting means), 31A and 31B CPUs (drive control signal generating means and fault detecting means), 32A and 32B memories (drive control signal generating means and fault detecting means), 33A and 33B input latch circuits (drive control signal generating means), 34A and 34B input latch circuits (fault detecting means), 35A and 35B output latch circuits (drive control signal generating means), 36A and 36B output drivers, 40 collating means, 50A and 50B synchronized signal generating means, 51A, 52A, 51B and 52B synchronized signal generators, 60 a safety circuit, 61A and 61B circuit breakers, 80 a clutch (clutch-brake), 90 a brake (clutch-brake), AC an AC power supply, SS an ON-OFF command signal (running command pulse signal), ZCRS a zero-cross synchronized pulse signal, CNT a drive control signal, TP a trigger pulse (drive control signal), FB1 and FB2 synchronized signals, EMG a fault detecting signal, and FSS a power cut-off signal.

DESCRIPTION OF THE PREFERRED EMBODIMENT

In the following, description will be given on an embodiment of the present invention in connection with the drawings.

Figure 2:
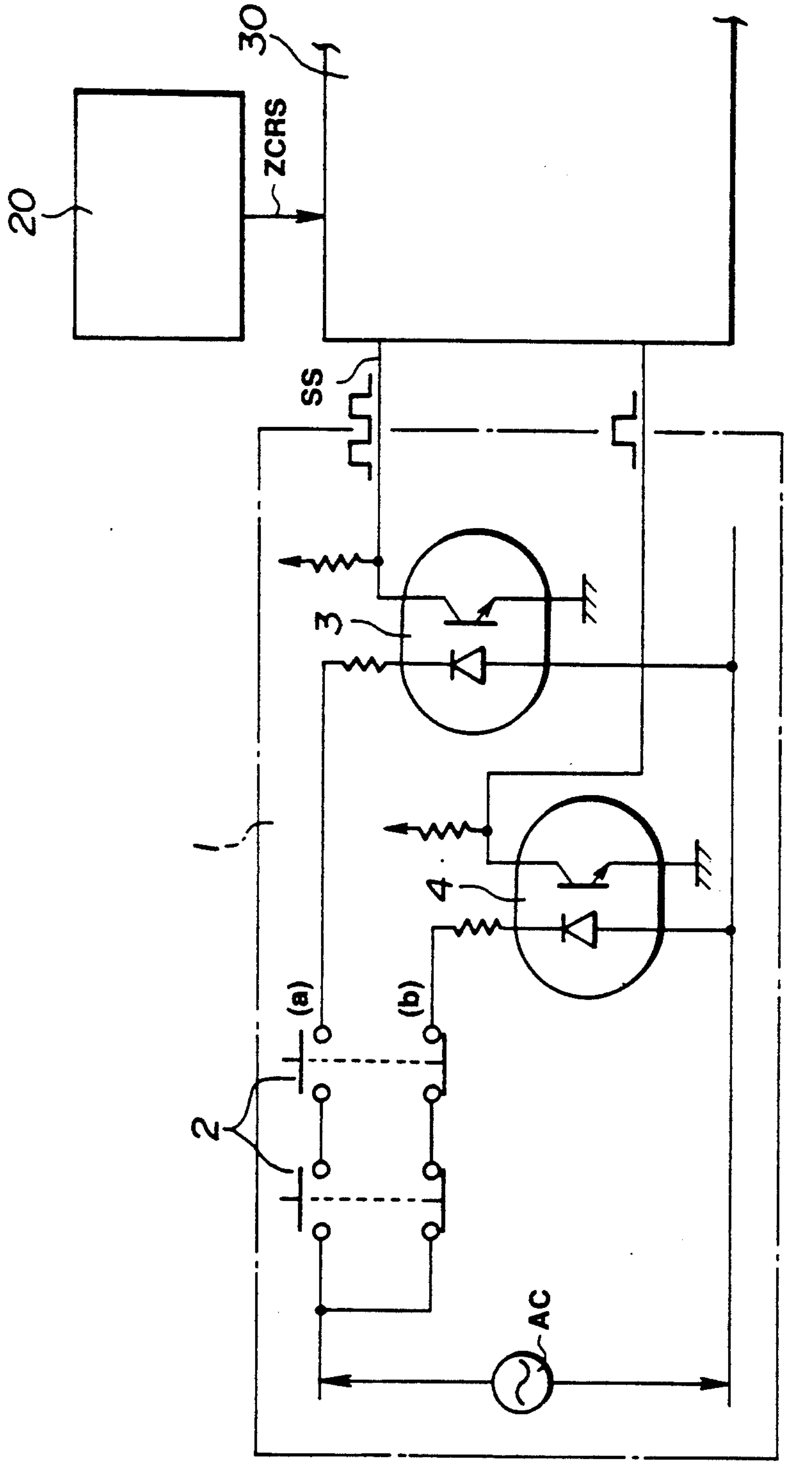
FIG. 2 is a circuit diagram of a running operation panel for a running command pulse signal generating means of the same.

As shown in FIG. 1 and FIG. 2, the clutch-brake drive control of the present invention comprises a pair of solenoid driving circuits 10A and 10B, respectively corresponding to solenoids 15A and 15B respectively of a double solenoid valve (15A and 15B), running command pulse signal generating means (1), zero-cross synchronized pulse signal generating means (20), two lines of drive control signal generating means (31A, 32A, etc.; 31B, 32B, etc.), synchronized signal generating means (50A, 50B), collating means (40), two lines of fault detecting means (31A, 32A, etc.; 31B, 32B, etc.), whereby synchronization and validity of the running command pulse signal SS and the drive control signals (CNT, CNT) are automatically identified. In case it is found as valid, the solenoids 15A and 15B are driven. In case the signals are not valid, and in case fault of semiconductor elements (11A, 11B) is automatically detected, AC power supplies (AC, AC) to the solenoids 15A and 15B of each of the solenoid driving circuits 10A and 10B are forcibly cut off to stop the press. Thus, perfect fail-safe function is provided.

Figure 9:
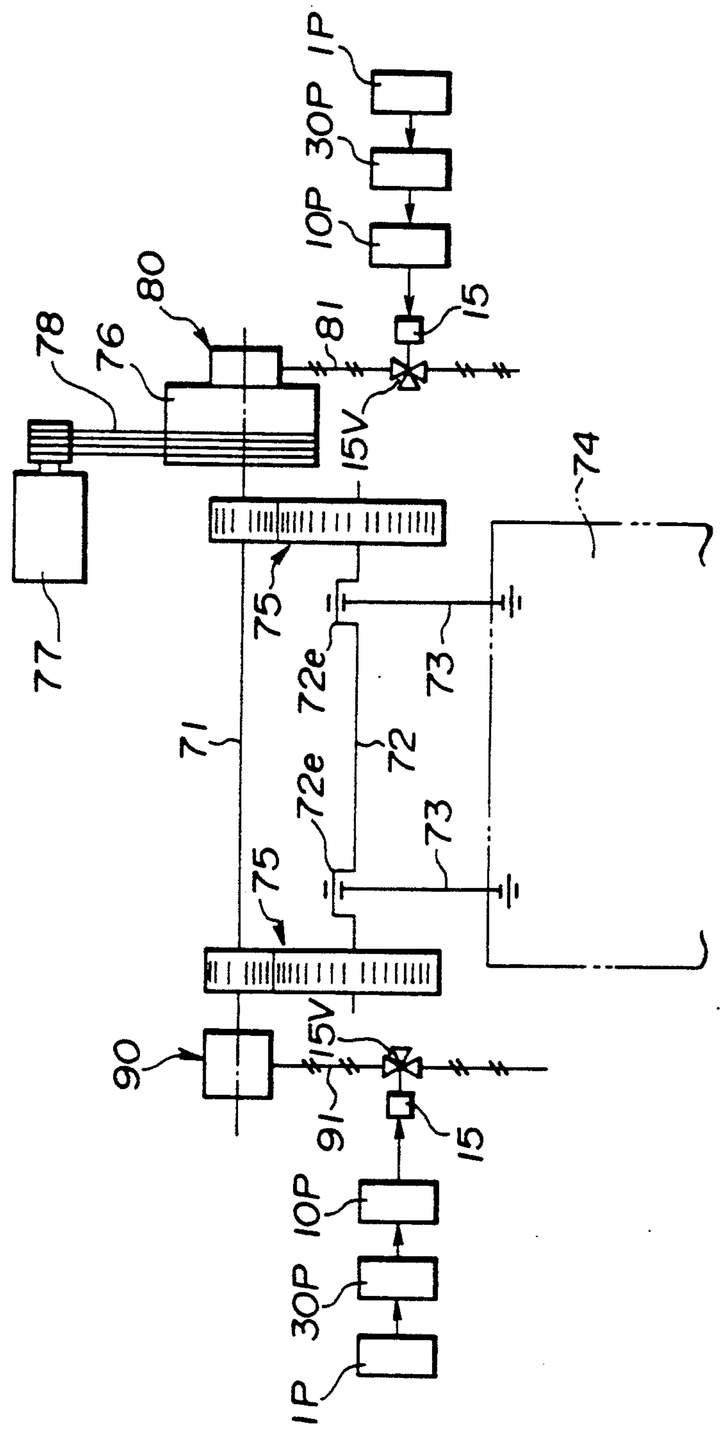
FIG. 9 (PRIOR ART)
FIG. 9 is a diagram for explaining a press machine and a clutch-brake in a conventional arrangement.

The clutch-brake in the present embodiment is designed as a combination type (clutch 80 and brake 90 in FIG. 9 are integrated). By ON-OFF driving of the double solenoid valves (15A, 15B), i.e. two solenoids 15A and 15B, the operation of the press is started or stopped.

In case there is only one solenoid 15 (15A or 15B), the arrangement should include one solenoid driving circuit 10 (10A or 10B), one line of drive control signal generating means (31A, 32A, etc. or 31B, 32B, etc.), one line of fault detecting means (31A, 32A, etc. or 31B, 32B, etc.), and collating means 40 should be excluded.

In FIG. 1, 10A (10B) designates a solenoid driving circuit of a solenoid 15A (15B), and AC power supply (AC), a solenoid 15A (15B), and a TRIAC 11A (11B) as a semiconductor element are connected in series. For elements 61A and 61B, description will be given later.

This TRIAC 11A (11B) is placed under ON-OFF control by a drive control signal CNT (CNT) [trigger pulse TP (TP) generated through a pulse transformer 12A (12B)] inputted from two lines of drive control signal generating means in a control panel 30. On the secondary side of the pulse transformer 12A (12B), TRIAC 11A (11B) is connected via a diode 13A (13B) and a resistance 14A (14B).

Based on ON-OFF command signal inputted from a running operation panel 1, which provides the running command pulse signal generating means, the control panel 30 outputs the above drive control signal CNT synchronized with the zero-cross synchronized pulse signal ZCRS, which has been inputted from a power zero-cross synchronizing circuit 20 for forming the zero-cross synchronized pulse signal generating means. In the present embodiment, it is attempted to ensure safety in generation of the running command pulse signal SS and the drive control signal CNT as two lines of collating system.

As shown in FIG. 2, the running operation panel 1 uses an AC power supply (AC) as power source. When the manual running button 2 is continuously pressed, an ON command signal SS synchronized with the AC power supply (AC) is outputted from a photocoupler 3 as a pulse signal generator connected to a-contact. On the other hand, an OFF command signal (SS) is outputted from a photocoupler 4 connected to b-contact.

Figure 10:
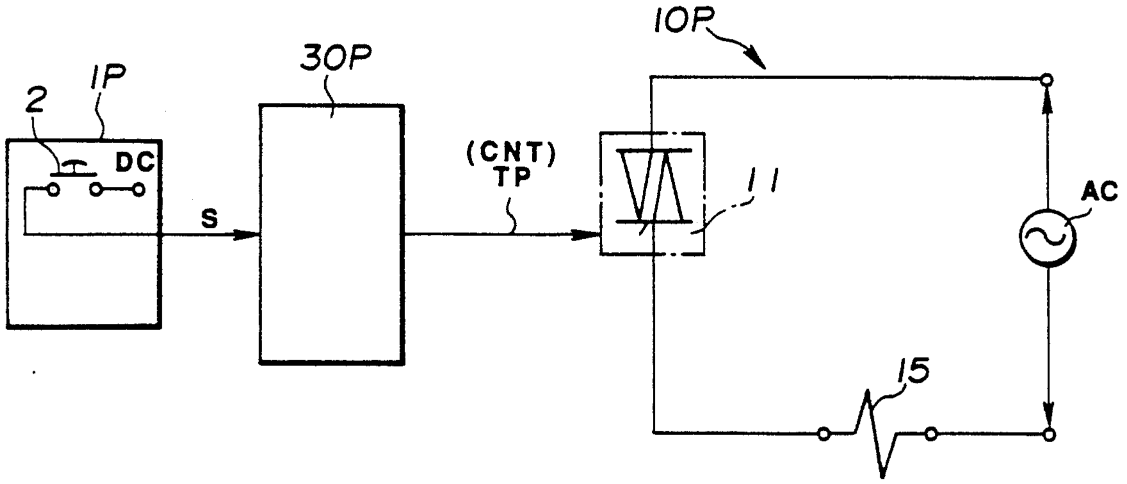
FIG.10 (PRIOR ART)
FIG. 10 is a diagram for explaining a clutch-brake drive control of a conventional AC power type.
Figure 11:
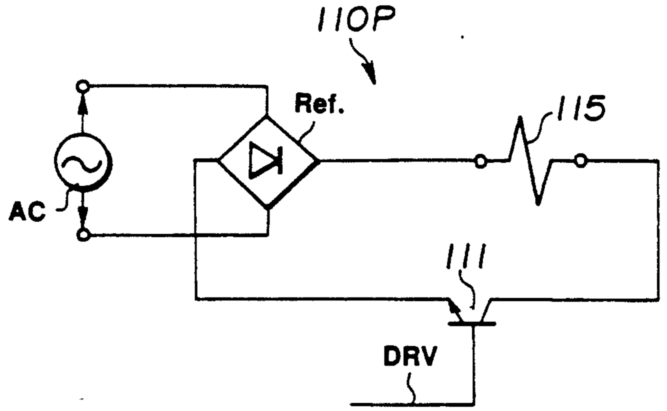
FIG.11 (PRIOR ART)
FIG. 11 is a diagram for explaining a clutch-brake drive control of a conventional DC power type.

Specifically, when the manual running button 2 is continuously pressed, a running command signal S with constant DC voltage has been outputted in the past as shown in FIG. 10. In contrast, according to the present invention, it is outputted as an AC zero-cross synchronized pulse signal (running command pulse signal SS) synchronized with the AC power supply (AC).

In the present embodiment, the running button 2 on the running operation panel 1 is a button for inching operation of a press machine, i.e. only when the running button 2 is kept pressed, the solenoids 15A and 15B for clutch-brake are driven and the press is operated, whereas a manual running button (2) for continuous running mode may be used.

Figure 3:
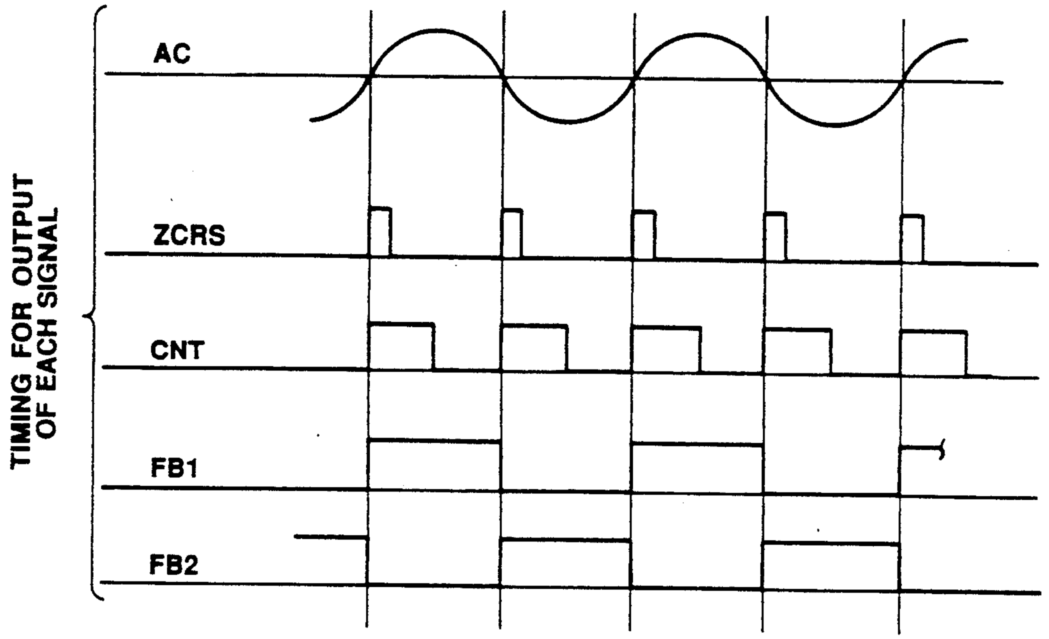
FIG. 3 is a timing chart for explaining output timing of each signal in the same embodiment.

With regard to this, the power zero-cross synchronizing circuit 20 comprises, as shown in FIG. 1, photocouplers 21A and 21B, which are a pair of bi-directional pulse signal generators connected to the AC power supply (AC), a flip-flip circuit 22 having NAND gates 22A and 22B, a pair of one-shot circuits 23A and 23B, and a NAND gate 24 with two inputs. As shown in FIG. 3 giving output timing of each signal, zero-cross synchronized pulse signal (ZCRS) synchronized with zero-cross point of the AC power supply (AC) is outputted.

In the present embodiment, the control panel 30 comprises two lines of drive control signal generating means and collating means 40 connected to the two lines by bus.

Specifically, one line (the other line) comprises a CPU 31A (31B), a memory 32A (32B), input latch circuits 33A and 34A (33B and 34B), and output latch circuit 35A (35B), and an output driver 36A (36B), and both lines are connected by bus via the collating means (bus collating circuit) 40.

That is, the running command pulse signal SS synchronized with the AC power supply (AC) from the running operation panel 1 is latched in an input latch circuit 33A (33B), and synchronized with the zero-cross synchronized pulse signal ZCRS from the power zero-cross synchronizing circuit 20. The validity is checked in each line and is collated by the collating means 40. Accordingly, the drive control signal CNT (CNT) output from an output latch circuit 35A (35B) and an output driver 36A (36B) will have high reliability because of this double checking.

The drive control signal generating means on one line (the other line) comprises, as shown in FIG. 1, an input latch circuit 33A (33B), a CPU 31A (31B), a memory 32A (32B), and an output latch circuit 35A (35B), and it is regarded as means for outputting the drive control signal CNT (CNT) to a corresponding solenoid driving circuit 10A (10B).

CPU 31A (31B) compares the zero-cross synchronized pulse signal ZCRS from said power zero-cross synchronizing circuit 20 with an ON-OFF command signal SS as inputted, and synchronization of the two signals SS and ZCRS are checked. If the two signals SS and ZCRS are synchronized, the running operation panel 1 is normal. If not synchronized, it is considered that the photocouplers 3 and 4 are abnormal, for example. Moreover, the results of synchronization checking on the two lines are checked by the collating means 40.

Accordingly, each drive control signal CNT is based on a reliable ON command signal SS and generated through synchronization of the zero-cross synchronized pulse signal ZCRS. Thus, it is outputted on the assumption that each component of the system is normal. Thus, system safety is assured.

This zero-cross synchronized pulse signal ZCRS is inputted to CPUs 31A and 31B of the two lines as an interrupt signal. Because the drive control signals CNT and CNT outputted from the control panel (two drive control signal generating means) 30 are synchronized with zero-cross signal (ZCRS) of the AC power supply (AC), if the drive control signal CNT (trigger pulse TP) is added to the semiconductor elements (11A and 11B), it is possible to continuously turn TRIACs 11A and 11B on. If the drive control signal CNT (TP) is turned off, TRIACs 11A and 11B can be automatically turned off at the next zero-cross point.

Next, the collating means 40 checks synchronization and coordination of the generating and operating condition of the drive control signal CNT in the two drive control signal generating means (31A and others; 31B and others). If judged as not in coordination, it forcibly cuts off the AC power supplies of solenoid driving circuits 10A and 10B. The power is also cut off when the running command pulse signals SS and SS inputted to each line are not in coordination.

Describing in more detail, the collating means 40 compares synchronizations of the running command pulse signal SS with the zero-cross synchronized pulse signal ZCRS and turns a signal EMG to an H level only in a normal case, i.e. only when the running command pulse signal SS inputted from the running operation panel 1 is valid and when generation of the drive control signal CNT in each of the drive control signal generating means (31A, 32A, etc.; 31B, 32B, etc.) is coordinated. By exciting a safety circuit (relay RY) 60 with this signal EMG, circuit breakers (relay auxiliary contact) 61A and 61B are turned on. As the result, AC power supplies (AC) of solenoid driving circuits 10A and 10B are energized. On the other hand, if a fault occurs in any of them, fault detecting signal EMG is outputted (L level) and the relay RY (60) is turned to non-excitation, i.e. the auxiliary contacts (61A and 61B) are turned off to forcibly cut off the AC power supply (AC). This assures higher safety of the operation.

Next, the fault detecting means comprises synchronized signal generating means 50A (50B) for generating synchronized signals FB1 and FB2 synchronized with AC power supply (AC), identifying data memorizing means 32A (32B), and fault identifying means [31A, 32A (31B, 32B)] and it forcibly cuts off the AC power supplies (AC and AC) of the solenoid driving circuits 10A and 10B when a fault is detected.

The synchronized signal generating means 50A (50B) comprises a pair of synchronized signal generators 51A and 52A (51B, 52B) connected in parallel to TRIAC 11A (11B), i.e. semiconductor element. Thus, as in FIG. 3 showing output timing of each signal, synchronized signals FB1 and FB2 with phase deviated by 180° are outputted from the synchronized signal generators 51A and 52A (51B and 52B).

That is, the synchronized signal FB1 (FB2) is outputted when the corresponding components of TRIAC 11A (11B) are in OFF condition and it is not outputted if the components are in ON condition.

The OFF condition includes not only the OFF condition where the drive control signal CNT (trigger pulse TP) is not inputted, but also the case where fault occurs to the corresponding components on the open side or cut-off side. On the other hand, the ON condition includes not only the ON condition where drive control signal CNT (TP) is inputted, but also the case where fault occurs to the corresponding components on the continuity side or the case of short-circuiting.

The synchronized signals FB1 and FB2 are inputted to the input latch circuits 34A and 34B of the control panel respectively. This is because the collating means 40 checks the two lines.

The reason for this is that the fault identifying means (31A, 32A, etc.; 31B, 32B, etc.) are built up on the component elements of the control panel 30 using their functions as described above. In this connection, the drive control signals (CNT and CNT) are obtained within the control panel 30 and are not inputted from outside.

Next, the identifying data memorizing means is means for memorizing the data for identifying fault of said semiconductor element 11A (11B) from the combination of output conditions of the ON-OFF command signal (running command pulse signal SS) of solenoid 15A (15B), synchronized signals FB1 and FB2, and said drive control signal CNT. In the present embodiment, it consists of a memory (RAM) 32A (32B).

Figure 4:
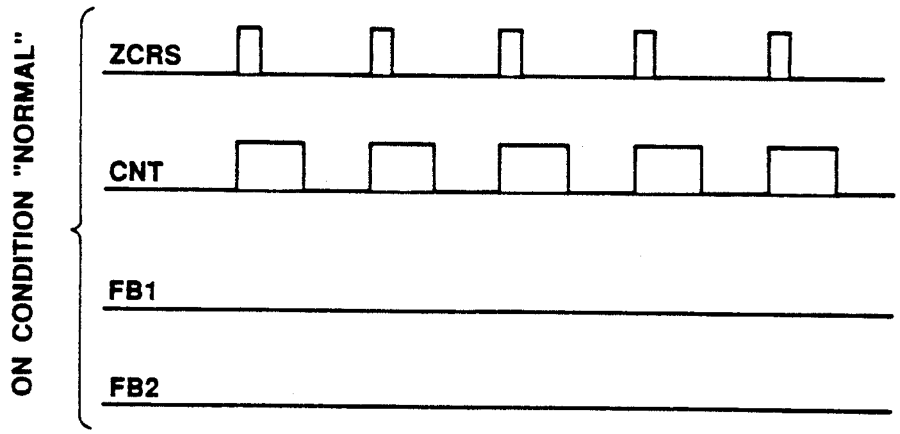
FIG. 4 is a timing chart of each signal output in an normal case in an ON condition.
Figure 5:
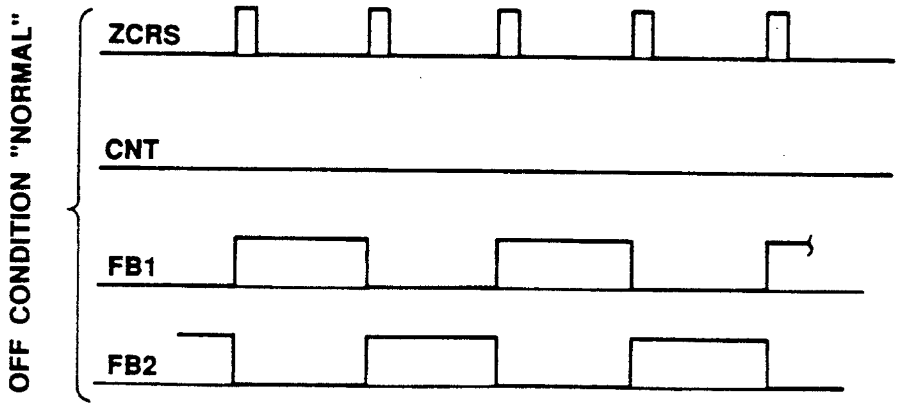
FIG. 5 is a timing chart of each signal output in a normal case in an OFF condition.
Figure 7:
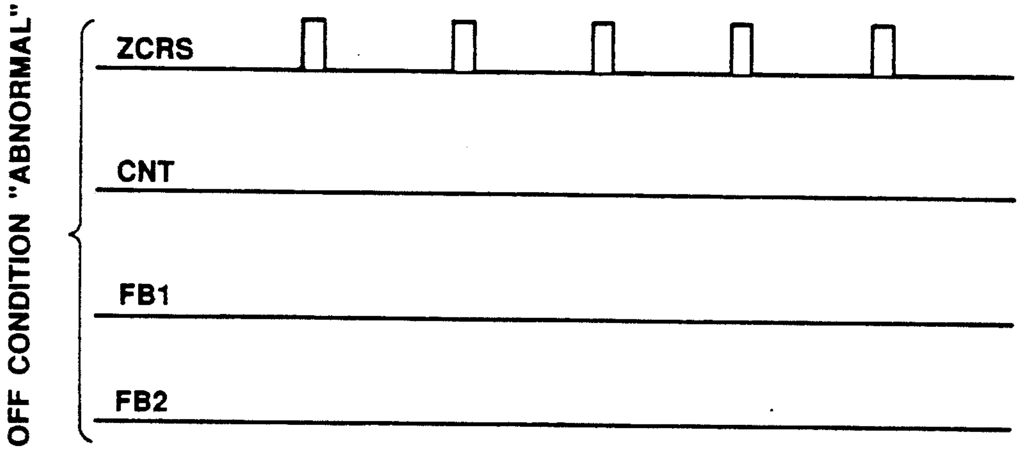
FIG. 7 is a timing chart of each signal in an abnormal case (2) in an OFF condition.
Figure 8:
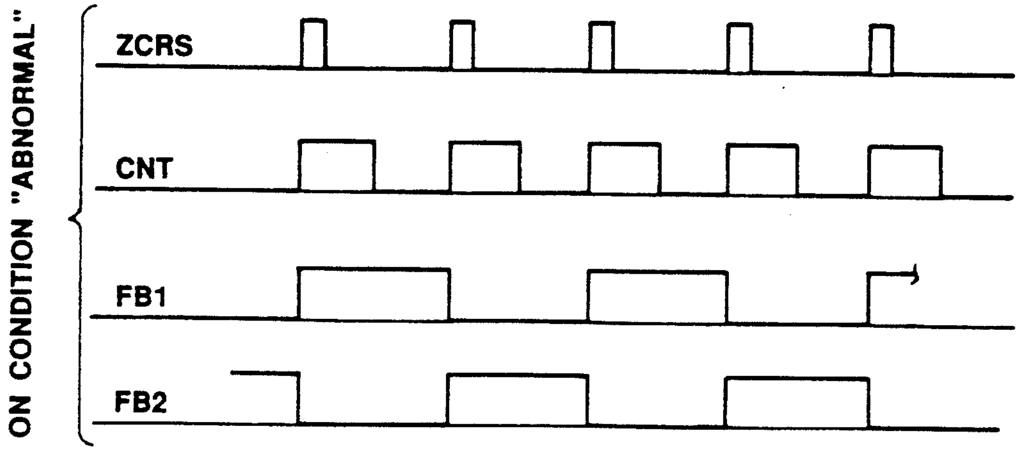
FIG. 8 is a timing chart of each signal in an abnormal case in an OFF condition.

The identifying data are fault identifying data under the OFF condition (FIG. 6 and FIG. 7) and the fault identifying data under the ON condition (FIG. 8). In the present embodiment, it includes normal status identifying data under the ON condition (FIG. 4) and normal status identifying data under the OFF condition (FIG. 5).

The fault identifying means comprises a memory 32A (32B) for temporarily memorizing (storing) the inputted signals CNT, FB1 and FB2 and a CPU 31A (31B) for comparing the identifying data memorized (stored) in the identifying data memorizing means 32A (32B) with the above temporarily memorized (stored) content and for identifying the presence of a fault and its content.

Figure 6:
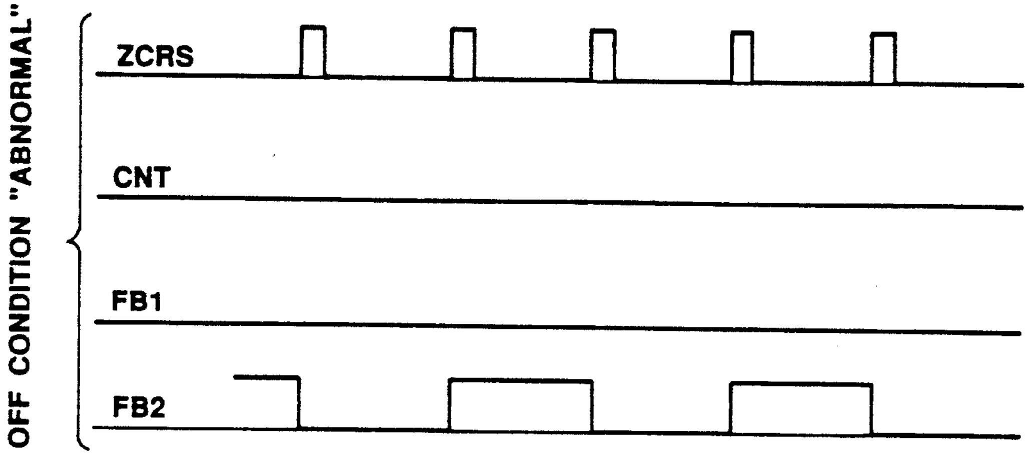
FIG. 6 is a timing chart of each signal in an abnormal case (1) in an OFF condition.

Because the condition shown in FIG. 6 is the condition (pattern of signals CNT, FB1 and FB2) where the OFF command is issued to the clutch-brake, i.e. the condition where the drive control signal CNT is not yet outputted (L level), TRIAC 11A (11B) is turned off. Accordingly, in a normal case, the two synchronized signals FB1 and FB2 should be outputted (H level) from the two pulse signal generators 51A and 52A (51B and 52B) as shown in FIG. 5.

However, if the signal FB1 is not outputted, this means that the corresponding component on one side of TRIAC 11A (11B) matching the pulse signal generator 51A (51B) is poorly controlled or a fault has occurred on the continuity side.

In the condition of FIG. 7, the drive control signal CNT is at an L level, and the two signals FB1 and FB2 are outputted as shown in FIG. 5 in a normal case. However, the two signals FB1 and FB2 are both not outputted. That is, an element component for both polarity of the semiconductor, i.e. TRIAC 11A (11B), is short-circuited, or a current path such as the solenoid driving circuit 10A (10B), control panel 30, etc. may be disconnected.

Further, in the condition of FIG. 8, the drive control signal CNT is outputted (H level) by the ON command of the clutch-brake, TRIAC 11A (11B) is turned on, and the solenoid 15A (15B) is driven. Therefore, the two pulse signals FB1 and FB2 should be at the L level as shown in FIG. 4 in a normal case, but the two synchronized signals FB1 and FB2 are both at the H level. This means that a fault has occurred to TRIAC 11A (11B) on the open side or on the cut-off side.

By such fault identifying means [31A, 32A (31B, 32B)], the drive control signal CNT is at the H level and the two synchronized signals FB1 and FB2 are at the L level, as shown in FIG. 4 during the ON command of the clutch-brake. With such a signal combination, it is identified that the entire drive control system including the semiconductor element is normal. On the other hand, during an OFF command, if the signal combination is as shown in FIG. 5, it is identified that the entire drive control system including the semiconductor element 11A (11B) is normal. This means that fault can be monitored not only when the solenoid 15A (15B) is driven but also when it is stopped.

Next, in case either one or both of the fault detecting means (31A, 32A, etc.) and (31B, 32B, etc.) automatically detect "fault" in the present embodiment, it simultaneously serves as emergency stop means (60, 61A, 61B) of the above collating means and cuts off the AC power supply (AC). That is, fault detection signal EMG (L level) is issued to a safety circuit 60 having an electromagnetic relay RY, notifying emergency stop (L level). Then, the safety circuit 60 outputs (OFF) a power cut-off signal FSS (OFF in case of relay auxiliary contact) to circuit breakers 61A and 61B having relay auxiliary contact connected to each of the solenoid driving circuits 10A and 10B, and the AC power supplies (AC and AC) are forcibly cut off. If continuity fault occurs on risky side of the semiconductor elements (11A, 11B), the solenoids 15A and 15B can be immediately turned off to safety side.

Thus, perfect fail-safe function can be provided.

Next, description will be given on the operation of this embodiment.

When the clutch-brake is turned off

When the solenoid 15A (15B) is not driven, an OFF command signal SS (L level) from the running operation panel 1 is latched on the input latch circuit 33A (33B). Because the drive control signal CNT (TP) is at the L level, TRIAC 11A (11B) is turned off, and synchronized signals FB1 and FB2 are outputted from pulse signal generators 51A and 52A (51B, 52B).

Therefore, CPU 31A (31B) as the fault detecting means compares the combination of the inputted two synchronized signals FB1 and FB2, and the drive control signal CNT read in the control panel 30, with the identifying data for the case of the OFF command signal SS memorized in the memory 32A (32B) (identifying data memorizing means). If it is the condition shown in FIG. 5, it is judged as normal. If it is the condition of FIG. 6, it is judged that element component on one side of TRIAC 11A (11B) is in a fault state. If it is the condition shown in FIG. 7, it is judged that a fault has occurred on the continuity side of TRIAC 11A (11B).

Accordingly, in case the fault detecting means [31A, 32A, etc. (31B, 32B, etc.)] judges that the condition is "normal" before the press is operated, the clutch-brake can be turned on at any time, and the press can be started.

On the other hand, if the condition is detected as "abnormal", there is no possibility that the press operation is started. The fault can be quickly and accurately corrected and this will contribute to the increase of productivity.

When clutch-brake is turned on

When a running (ON) command for the solenoid 15A (15B) is issued by the manual running button 2 on the running operation panel 1, the ON command signal SS (H level) is latched on the input latch circuits 33A and 33B as shown in FIG. 2.

Then, the two lines (31A, 31B), i.e. the drive control signal generating means (31A, 32A, etc.; 31B, 32B, etc.), check the validity of the ON command signal SS upon receiving interrupt input of the zero-cross synchronized pulse signal ZCRS from the power zero-cross synchronizing circuit 20. Then, the drive control signal CNT, synchronized with the zero-cross of the AC power supply (AC), is outputted to a pulse transformer 12A (12B) through the output latch circuit 35A (35B) and the output driver 36A (36B). When it is judged by the collating means 40 that the ON command signal SS is not valid, CPUs 31A and 31B output a low level fault detecting signal EMG, and the two solenoid driving circuits 10A and 10B are separated from the AC power supply (AC). Naturally, the drive control signal CNT is outputted, and safety is assured.

Because synchronization and coordination of the line on CPU 31A and the line on CPU 31B are collated by the collating means 40, the reliability of the outputted drive control signal CNT is high. In this step, it is understood that the drive control signal CNT has been inputted to the fault detecting means [31A, 32A (31B, 32B)].

The drive control signal (CNT) is converted to a trigger pulse (TP) by the pulse transformer 12A (12B), and TRIAC 11A (11B) as a semiconductor device is driven (ON).

Therefore, the synchronized signals FB1 and FB2 from the two signal generators 51A and 52A (51B and 52B) are turned to the L level. That is, if TRIAC 11A (11B) and the entire drive control system are normal, the signal combination condition of FIG. 5 is turned to the signal combination condition of FIG. 4. Thus, it is confirmed that normal press operation is being carried out.

However, if the two synchronized signals FB1 and FB2 are continuously outputted at the H level as shown in FIG. 8, the fault detecting means [31A, 32A (31B, 32B)] detects the fault as a fault on the cut-off side, an element in an open condition or current pathway disconnection.

Therefore, the operator can take appropriate repair action quickly.

Press operation stoppage . . . clutch-brake ON→OFF

When a press running stop command is issued on the running operation panel 1 of FIG. 2, an OFF command signal SS is latched on the input latch circuit 33A (33B) instead of the ON command signal. Then, the combination of the signals CNT, FB1 and FB2 are changed from the condition of FIG. 4 to that of FIG. 5.

Because the drive control signal CNT is turned to the L level, TRIAC 11A (11B) is turned off, and the load, i.e. solenoid 15A (15B), is turned to non-excitation. That is, the clutch-brake is turned off, and the slide stops at the predetermined position. Then, the synchronized signals FB1 and FB2 are outputted (at the H level) from the two pulse signal generators 51A and 52A (51B and 52B). Accordingly, the fault detecting means 31A and 32A (31B and 32B) judges conditions as normal, and it is confirmed that the operation has been stopped safely and perfectly. However, if one of the synchronized signal FB1 remains on the L level as shown in FIG. 6 despite the fact that the drive control signal CNT is turned to the L level, the fault detecting means 31A and 31B detects a fault, that is, one of the element components of TRIAC 11A (11B) is turned on. Further, if the condition is as shown in FIG. 7, it is judged as the worst fault, that is, both element components are uncontrollable and are short-circuited.

When the fault detecting means detects that the semiconductor elements (11A and 11B) are in a fault condition, the collating means 40 outputs an L level fault detecting signal EMG. Then, the safety circuit 60 and the circuit breakers 61A and 61B immediately cut off the AC power supplies (AC and AC) of the solenoid driving circuits 10A and 10B.

As the result, the clutch-brake, i.e. solenoids (15A and 15B) are turned off, and perfect fail-safe operation is assured.

According to the present embodiment, there are provided a pair of solenoid driving circuits 10A and 10B, running command pulse signal generating means (1), zero-cross synchronized pulse signal generating means (20), two lines of drive signal generating means [30 (31A, 31B, etc.)], collating means 40, synchronized signal generating means (50A and 50B), and two lines of fault detecting means (31A, 32A, etc.; 31B, 32B, etc.), and the clutch-brake (solenoids 15A and 15B) are turned on, and the press is operated, only in a normal case, that is, when a running command pulse signal SS and a drive control signal CNT (CNT) are identified as valid through checking of synchronization and coordination and no continuity fault occurs on semiconductor elements (11A and 11B). In case of fault, AC power supply AC (AC) of solenoid driving circuits 10A and 10B are forcibly cut off. This assures safe and reliable press operation, and perfect fail-safe operation is provided even in case of a fault.

On the running operation panel 1, an ON-OFF command signal is outputted as a running command pulse signal (SS) synchronized with AC power supply (AC). Two lines of drive control signal generating means (31A, 32A, 33A, 35A, 31B, 32B, 33B and 35B) compares synchronization of zero-cross synchronized pulse signal ZCRS from the power-cross synchronizing circuit 20 with the running command pulse signal SS and automatically identifies the validity of the running command pulse signal (SS). Thus, the safety of the press machine is assured even when fault occurs on the running operation panel 1 (3, 4).

The collating means 40 collates and judges the timing of generation of the drive control signals CNT and CNT of two lines (two drive control signal generating means) and forcibly cuts off the AC power supplies (AC and AC) of the two solenoid driving circuits 10A and 10B in case of a fault. This ensures safe press operation by the highly reliable drive control signals CNT and CNT through double checking. In case a fault occurs, fail-safe operation is provided.

Also, there are provided synchronized signal generating means 51A and 52A (51B and 52B) connected in parallel to a semiconductor element 11A (11B) and fault detecting means comprising the identifying data memorizing means [32A (32B)] for memorizing the data for identifying a fault and the identifying means [31A, 32A (31B, 32B)], and the combination of each of the inputted signals CNT, FB1 and FB2 is compared with the corresponding memorized (stored) identifying data, and a fault in the entire drive control system including the semiconductor element 11A (11B) is automatically detected. This assures safe and reliable operation of the solenoid 15A (15B) and contributes to the protection of the equipment and the operators and to the improvement of production capacity.

The synchronized signal generating means 50A (50B) comprises a pair of AC synchronized signal generators 51A and 52A (51B and 52B), which output synchronized signals FB1 and FB2 when TRIAC 11A (11B), i.e. the semiconductor element, is OFF. This ensures not only fault detection as shown in FIG. 6 to FIG. 8 but also the monitoring of the normal condition when the solenoid 15A (15B) is in the ON condition and the OFF condition as shown in FIG. 4 and FIG. 5.

The identifying data memorized (stored) in the identifying data memorizing means 32A (32B) are made up as a combination of a drive control signal CNT, synchronized signals FB1 and FB2 and an ON-OFF command signal SS. Accordingly, it is possible to identify, in addition to a continuity side fault, a cut-off side fault, an open fault, uncontrollability, etc. of the semiconductor elements (11A and 11B), faults of the driving and control characteristics of the solenoid driving circuit 10A (10B) and the control panel (two drive control signal generating means) 30 as well as a fault such as current path disconnection. Moreover, it is possible to identify three-value checking.

The fault detecting means comprises CPU 31A (31B), which constitutes a part of the control panel 30, and it detects faults quickly and accurately and easily outputs a display signal such as "normal" or "abnormal" when a fault is detected, or a press interlocking signal.

The load, i.e. double solenoid valve, comprises double solenoids 15A and 15B, and each of the solenoids 15A and 15B is furnished with special-purpose solenoid driving circuits 10A and 10B respectively, and this assures safety both mechanically and electronically.

The control panel 30, which constitutes the drive control signal generating means, is designed as a double system comprising a line on CPU 31A and a line on CPU 31B connected by a bus 37A (37B) respectively, and coordination and synchronization of the two lines are collated by the collating means 40. This is helpful to provide extremely high reliability for each of the outputted drive control signals CNT. As the result, fault detection by the fault detecting means [31A, 32A (31B, 32B)] is double-checked, and the results of detection are highly reliable.

Further, the collating means 40 outputs an L level fault detection signal EMG through emergency stop means (60, 61A, 61B) and immediately cuts off (OFF) AC power supplies (AC) of each of the solenoid driving circuits 10A and 10B, not only when the running command pulse signal SS and the like are valid but also when a fault has been detected by the fault detecting means (31A, 32A, 31B, 32B). Accordingly, even when a fault such as short-circuiting occurs in the semiconductor elements 11A and 11B, the solenoids (15A and 15B) can be safely turned off, and the press can be stopped by the operation of the clutch-brake. As the result, perfect fail-safe operation can be furnished.

Further, the running operation panel 1 for outputting an ON-OFF command signal, i.e. the running command pulse signal SS, is designed as an AC power system, and synchronization of the zero-cross synchronized pulse signal ZCRS inputted from the power zero-cross synchronizing circuit 20 and the running command pulse signal SS, is checked on each of the two lines (31A, 31B), and the reliability and the safety of each of the drive control signals CNT are assured.

What is claimed is:

1. An apparatus for drive control of a clutch-brake for a press machine by turning a solenoid valve on and off, comprising:

a solenoid driving circuit, in which a solenoid of said solenoid valve, an AC power supply and a semiconductor device for opening or closing said AC power supply are connected in series;

running command pulse signal generation means for generating a running command pulse signal synchronized with said AC power supply, said running command pulse signal indicative of an ON-OFF condition of a running button;

zero-cross synchronized pulse signal generating means for generating a zero-cross synchronized pulse signal synchronized with a zero-cross point of said AC power supply;

drive control signal generating means for generating a drive control signal and outputting the drive control signal to said semiconductor element under the condition that said running command pulse signal is recognized as valid through comparison of synchronization of said running command pulse signal and said zero-cross synchronized pulse signal;

synchronizing signal generating means for generating synchronized signals synchronized with the AC power supply in case said semiconductor element is in an OFF condition; and fault detecting means for detecting a fault of said semiconductor element from the combination of an output condition of said synchronized signals and said drive control signal, and for forcibly cutting off said AC power supply of said solenoid driving circuit when the fault is detected.

2. An apparatus according to claim 1, wherein said running command pulse signal generating means comprises a running button having an a-contact and a b-contact connected in series to an AC power supply and pulse signal generators connected correspondingly to each of said contacts.

3. An apparatus according to claim 1, wherein said zero-cross synchronized pulse signal generating means is furnished with a pair of bi-directional pulse signal generators mutually reversely connected to the AC power supply, a flip-flop circuit, a pair of one-shot circuits, and a two-input NAND gate.

4. An apparatus according to claim 1, wherein said fault detecting means includes identifying data memorizing means storing identifying data, said fault detecting means automatically detecting a fault of component elements, including said semiconductor element, through comparison of the identifying data stored in the identifying data memorizing means with said synchronized signals and said drive signal.

5. An apparatus according to claim 4, wherein said identifying data comprise a pattern of said synchronized signals and said drive signal which correspond to a combination of output conditions of said synchronized signals and said drive signal when said semiconductor element experiences a fault.

6. An apparatus for drive control of a clutch-brake of a press machine by turning a double solenoid valve on and off, comprising:

a pair of solenoid driving circuits, in each of which there are provided a solenoid of said double solenoid valve, an AC power supply and a semiconductor element for switching said AC power supply;

running command pulse signal generating means for generating a running command pulse signal synchronized with the AC power supply, said running command pulse signal indicative of an ON-OFF condition of a running button;

zero-cross synchronized pulse signal generating means for generating a zero-cross synchronized pulse signal synchronized with a zero-cross point of the AC power supply;

two lines of drive control signal generating means for generating respective drive control signals, and outputting the drive control signals to the semiconductor elements under the condition that the running command pulse signal is recognized as valid through synchronization of said running command pulse signal and said zero-cross synchronized pulse signal;

collating means for collating operations of the two lines of drive control signal generating means, judging whether the collated operations are in coordination, and forcibly cutting off the AC power supplies of said solenoid driving circuits when said operations of said drive control signal generating means are judged as not in coordination; and two lines of fault detecting means, comprising a pair of synchronized signal generating means connected in parallel to said semiconductor elements of said solenoid driving circuits, and for detecting a fault of said semiconductor elements by detecting a combination of output conditions of synchronized signals, issued from said synchronized signal generating means when said semiconductor elements are in an ON condition, and said drive signal, and for forcibly cutting off said AC power supplies of said solenoid driving circuits when the fault is detected.

7. A drive system for a press, comprising:

a valve;

a solenoid for opening and closing said valve;

a solenoid driving circuit, including:

an AC power supply, and a semiconductor device, responsive respectively to the application and removal of a drive control signal to be turned ON and OFF, for connecting and disconnecting the AC power supply with respect to said solenoid, said power supply and said semiconductor device connected in series to said solenoid;

running command pulse signal generation means for generating a running command pulse signal synchronized with the power supply, said running command pulse signal generation means including a running button having an ON state and an OFF state, the running command pulse signal indicative of the ON or OFF state of said running button;

zero-cross synchronized pulse signal generating means for generating a zero-cross synchronized pulse signal synchronized with a zero-cross point of said power supply;

drive control signal generating means for:

comparing the running command pulse signal and the zero-cross synchronized pulse signal, and generating the drive control signal and applying the drive control signal to said semiconductor element, only when the running command pulse signal and the zero-cross synchronized pulse signal are in synchronization;

synchronizing signal generating means for generating synchronized signals synchronized with the power supply if said semiconductor element is OFF;

means, responsive to a combination of the synchronized signals and the drive control signal, for detecting a fault of said semiconductor element; and means for forcibly cutting off the power supply from said solenoid when the fault is detected by said detecting means.

8. A drive system for a press according to claim 7, wherein said means for forcibly cutting off the power supply includes means for generating a power cut-off signal when the fault is detected by said detecting means, and a circuit breaker series connected in said solenoid driving circuit and responsive to the power cut-off signal to cut off the power supply from said solenoid.

9. A drive system for a press according to claim 7, wherein said valve is a first valve for a clutch of the press, said solenoid is a first solenoid for opening and closing said first valve, said solenoid driving circuit comprises a first solenoid driving circuit that includes a first semiconductor element, said drive control signal generating means comprising a first drive control signal generating means that compares the running command pulse signal and the zero-cross synchronized pulse signal, generates a first drive control signal and applies said first drive control signal to said first semiconductor element, only when the running command pulse signal and the zero-cross synchronized pulse signal are in synchronization; said synchronizing signal generating means comprising first synchronizing signal generating means that generates first synchronized signals synchronized with the power supply if said first semiconductor element is OFF, further comprising:

a second valve for a brake of the press;

a second solenoid for opening and closing said second valve;

a second solenoid driving circuit, including a second semiconductor device, responsive respectively to the application and removal of a second drive control signal to be turned ON and OFF, for connecting and disconnecting the AC power supply with respect to said second solenoid, said power supply and said second semiconductor device connected in series to said second solenoid, separately from said first solenoid driving circuit;

second drive control signal generating means for:

comparing the running command pulse signal and the zero-cross synchronized pulse signal, and generating the second drive control signal and applying the second drive control signal to said second semiconductor element, only when the running command pulse signal and the zero-cross synchronized pulse signal are in synchronization; and second synchronizing signal generating means for generating second synchronized signals synchronized with said power supply if said second semiconductor element is OFF;

said detecting means including first detecting means, responsive to a first combination of the first synchronized signals and the first drive control signal, for detecting a fault of said first semiconductor element, and second detecting means, responsive to a second combination of the second synchronized signals and the second drive control signal, for detecting a fault of said second semiconductor element;

said means for forcibly cutting comprising means for forcibly cutting off said power supply from both of said first and second solenoids when a fault is detected by either of said first and second detecting means;

further comprising checking and forcible cutting means for checking coordination of operations of the first and second drive control signal generating means, and forcibly cutting off said power supply from both of said first and second solenoids when the first and second drive control signals are judged as not in coordination.

10. A device according to claim 9, wherein said checking and forcible cutting means includes means for checking coordination of the first and second drive control signals.

* * * * *